B. & W. G. BURTON.
Breech-Loading and Magazine-Guns.
No. 143,614. Patented Oct. 14, 1873.
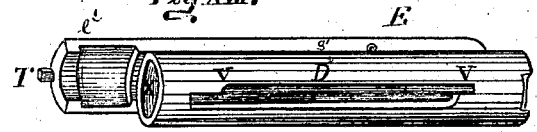
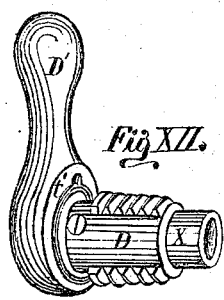
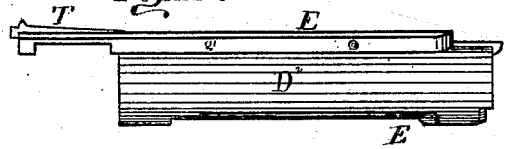
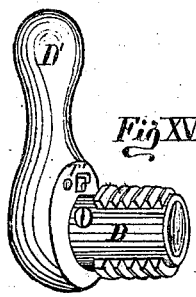
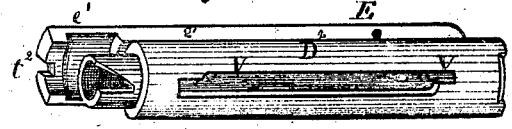
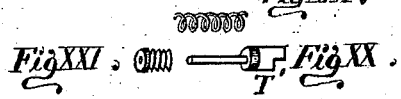
Witnesses.
B. S. Moulton
Edwin Wilkinson
Inventors.
Bethel Burton
Wingfield G. Burton 4 Sheets--Sheet 4.
B. & W. G. BURTON.
Breech-Loading and Magazine-Guns.
No. 143,614. Patented Oct. 14, 1873.
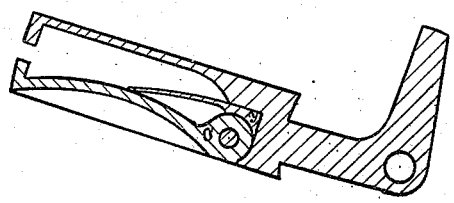
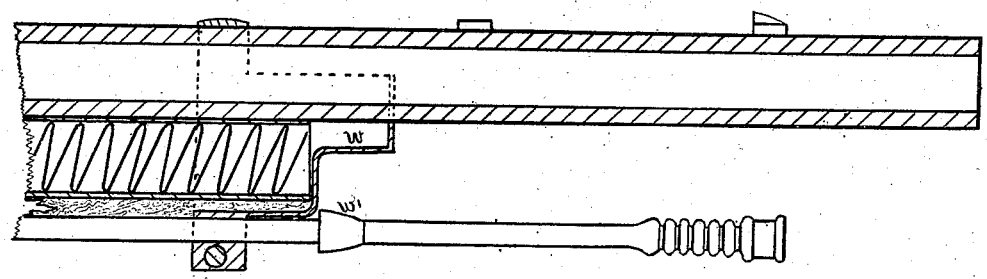
Witnesses:
B. S. Moulton
Edwin Wilkinson
Inventors,
Bethel Burton
Wingfield G. Burton

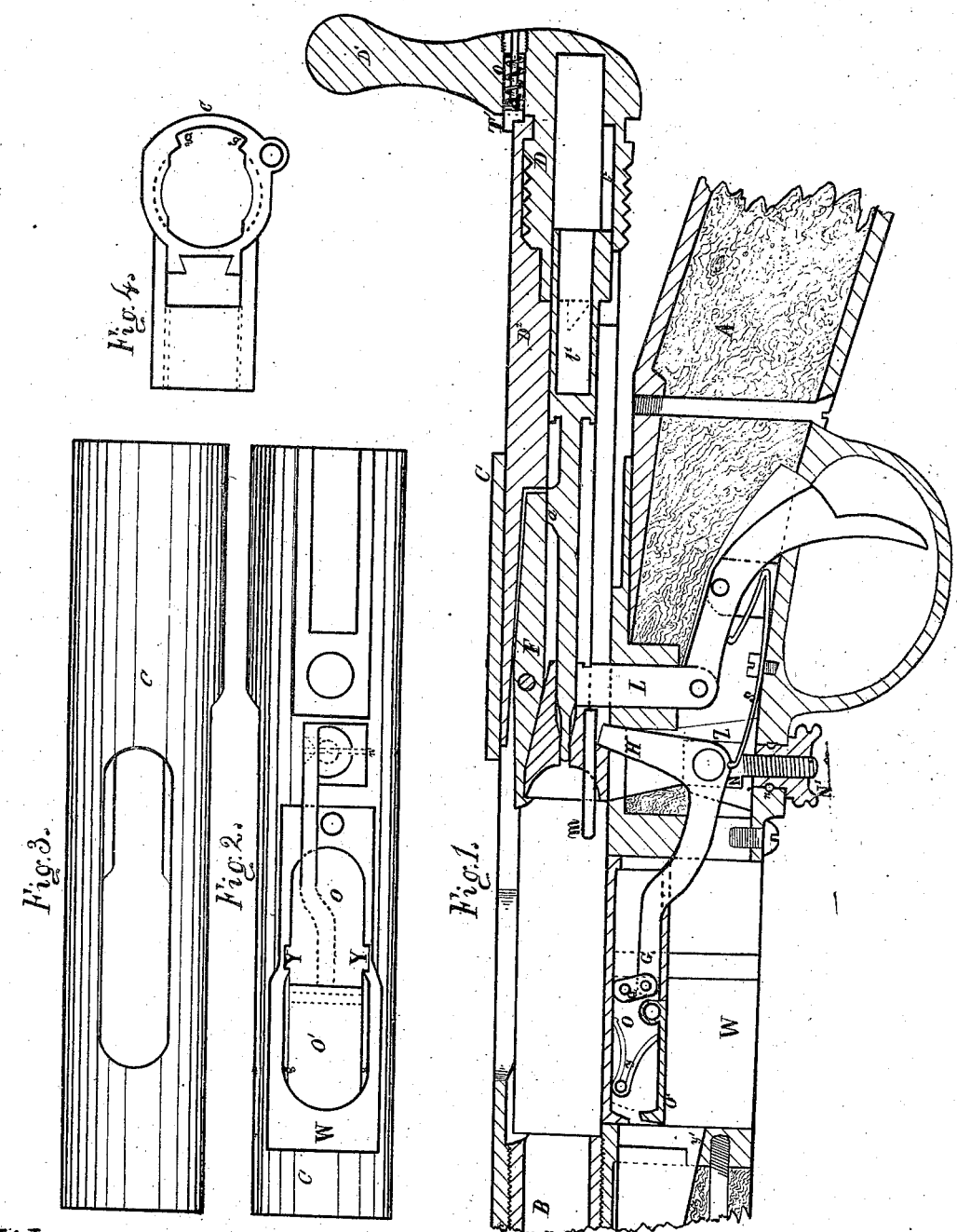

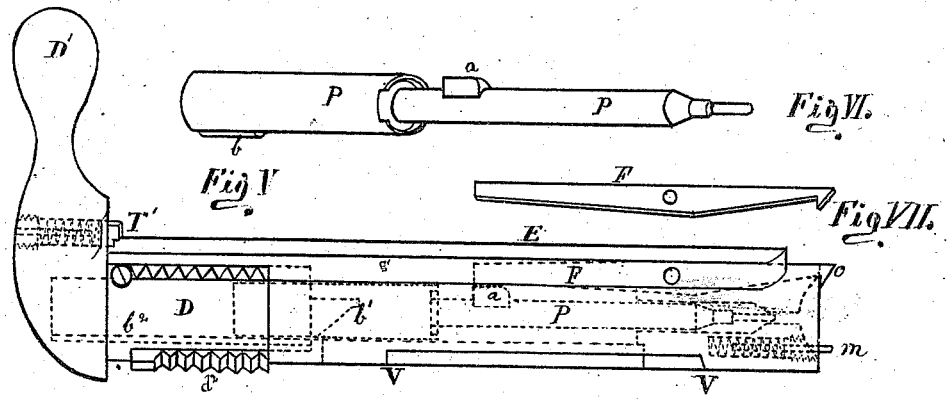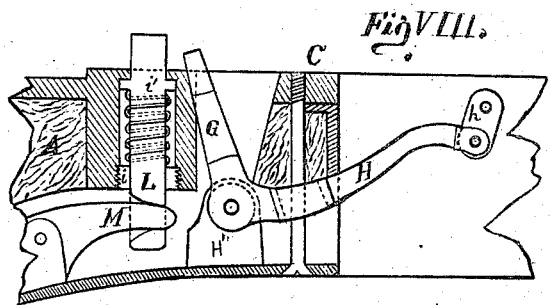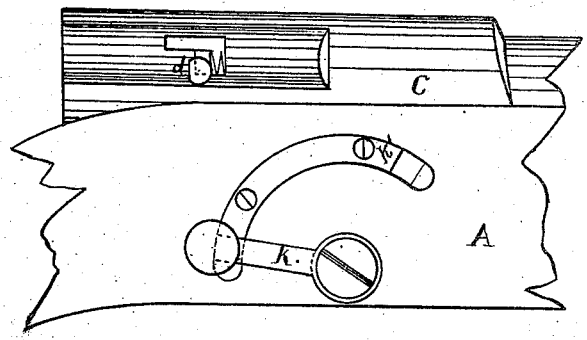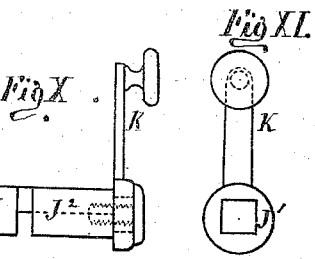

UNITED STATES PATENT OFFICE.

BETHEL BURTON AND WINGFIELD G. BURTON, OF BROOKLYN, NEW YORK; SAID BETHEL BURTON ASSIGNOR TO SAID WINGFIELD G. BURTON.

IMPROVEMENT IN BREECH-LOADING AND MAGAZINE GUNS.

Specification forming part of Letters Patent No. 143,614, dated October 14, 1873; application filed April 11, 1873.

*To all whom it may concern:*

Be it known that we, BETHEL BURTON and WINGFIELD G. BURTON, of the city of Brooklyn, in the county of Kings and State of New York, have invented certain Improvements in Magazine Breech-Loading Fire-Arms, of which the following is a specification:

The first part of our invention relates to the bolt and manner of constructing said bolt. The bolt, being divided, is coupled together by a round tenon on the rear part fitting in a corresponding hole in the forward part of the bolt. The forward part of the bolt extends over the rear part up to the lever, and holds both firmly together. The rear part of the bolt is provided with a stop-pin placed in the lever, and actuated by a spiral spring, which serves to prevent the rear part of the bolt from turning until in its proper place in the receiver. The lever-extractor is pivoted in the forward part of the bolt. The lever end is lifted by a lump or cam on the piston. When the rear part of the bolt is turned the other end of the lever-extractor is forced down on the cartridge. The forward part of the bolt has a groove cut in to allow the upper end of the arm of the bell-crank lever to work therein. The ends of this groove serve to move the arm of the bell-crank lever back and forth when opening or closing the breech, thus lifting and lowering the carrier.

The second part of our invention relates to the bell-crank lever and carrier which serves to convey the cartridge from the magazine to the barrel. The bell-crank lever is pivoted to the trigger-guard. The upright arm is lowered or raised by means of an eccentric joint or micrometer-screw. The other arm is pivoted to the carrier by means of a link. The carrier is provided with a gate, hinged to the lower side thereof. This gate is closed by a spring which yields to pressure from without, admitting the cartridges into the magazine, and prevents their return until the carrier is lowered, when the spiral spring in the magazine forces the cartridge onto the carrier, ready to be raised by the upward motion. The object of this part of our invention is, to impart an easy motion to the carrier; to enable the arm to be used as a breech-loader, reserving the magazine until needed; to lessen the wear of the parts subject to motion by disconnecting when not required to be used, and to facilitate the charging of the magazine without weakening the arm.

The third part of our invention relates to the proportions given to the opening in the upper part of the receiver, to prevent the loaded cartridge from being thrown out in the rapid upward motion of the carrier. To accomplish this the opening in the upper part of the receiver is shorter than the opening in the carrier-box, which allows the cartridge to rise from the magazine. The opening in the top may be cut farther back by leaving part of the circle, which is done by forming the dovetail slide, upon which the sides of the cover move. The same object may be attained by projecting pins from the side of the receiver, which will prevent the loaded cartridge from being thrown out. The object of this part of our invention is to avoid the necessity of making the bolt small enough to pass through the carrier, which is generally done, the bolt being left sufficiently strong to resist heavy charges and prevent loaded cartridges from being thrown out through the opening in the top of the receiver.

The fourth part of our invention relates to the piston or firing-pin, which is made with a rib, which works in a hole or groove in the rear bolt. The forward end of this rib passes into an opening cut in the rear of the forward bolt. At the joint an incline or cam is made on one side of this opening, against which the end of the rib on the piston slides when the rear of the bolt is rotated, which forces back the piston until the point is within the forward part of the bolt. Upon one side of the piston a lump or cam is formed, which serves to lift up the lever end of the extractor. The object of this part of our invention is to make use of the rib on the piston for the double purpose of turning and withdrawing the point of the piston within the surface of the bolt, to prevent contact with the fulminate of the cap, and to lift up the arm of the extractor by means of the cam on the piston-rod.

The fifth part of our invention relates to the construction of the sear-bolt, trigger, and sear-spring. A lump is formed on the under side of the receiver, in which is placed a spiral spring and nut and sear-bolt. The spiral spring is placed between the flange on the sear-bolt and the nut, through which the sear-bolt passes. The spring serves to keep the sear-bolt pressed up in place. A V-spring may be used, screwed to the trigger-guard under the arm of the trigger, which extends forward and supports the crank-lever and carrier, keeping the carrier from dropping down when the arm is used as a breech-loader. The object of this part of our invention is, to avoid cutting away the stock, and to impart a more pleasant feel to the pull of the trigger, and to prevent the carrier from falling down when in use as a breech-loader.

The sixth part of our invention relates to the combination of the nose-cap, band, and ramrod. The nose-cap is made to serve as a band, and to fasten the swivel and ramrod to. The rod is made with a flange. The point of the rod screws into the guide-box or its equivalent, forces the flange on the rod against the nose-cap, and thus retains the magazine-tube, spiral spring, and nose-cap in place. The object of this part of our invention is, to readily get at the magazine for cleaning or repairs, to lessen the number of parts, and diminish the cost.

Figure 1 is a longitudinal section of the gun at the breech. Fig. 2 is a view of the under side of receiver, crank-lever, carrier, and gate. Fig. 3 is a top view of receiver, showing the opening and stop to prevent the cartridge from being thrown out. Fig. 4 is a cross-section of receiver, showing the carrier, guide-box, and dovetail on which the sides of the cover slide. Fig. 5 is a side view of the bolt coupled together and detached from the receiver. Fig. 6 is a view of the piston. Fig. 7 is a view of the lever-extractor. Fig. 8 is a sectional view of the breech, showing the sear-bolt, spiral spring, crank-lever, and trigger. Figs. 9, 10, 11 show the construction and manner of operating the eccentric pin. Figs. 12 to 21 are views of the bolt in different positions. Fig. 22 is a section of the crank-lever and carrier in one piece, and the mode of attaching a gate thereto, for the purpose of charging the magazine from the under side. Fig. 23 is a sectional view, showing the mode of closing the magazine.

A is the stock. B is the barrel, screwed to the receiver C. D is the rear part of the bolt, coupled to the forward part of the bolt $D^2$ in the manner seen in Figs. 1, 5, 12, 13, 14, 15, 16, 17, and 18. The parts are coupled, and the lever $D^1$ in a vertical position, with the point of the pin T' in the groove $t^1$, as seen in Figs. 1, 5, 17, and 18. The rear part of the bolt D cannot turn, and is held firmly in place by the pin T' in the recess in the strap or cover $t^2$ until the bolt is shoved home, when the end of the pin T' strikes against the rear of the receiver C, which forces back the pin T' and allows the bolt D to turn, when the sectional screws on the bolt D engage the corresponding screws in the rear of the receiver, which sustains the recoil. The spring T and T, Figs. 15, 16, let into the coupling-strap or cover E, Figs. 13, 14, and working in a groove, $t^1$, cut in the face of the lever $D^1$, Fig. 12, secures the bolt D from turning. A flat spring let into the outside of the lever $D^1$ may also be used to press against the pin T', to couple the bolt together, if preferred. The piston P is made with a rib, $b$, which works in a groove or hole, $b^2$, in the bolt D, and upon the incline or cam $b^1$ in the joint of the bolt $D^2$, which serves to draw the piston within the body of the bolt, to prevent it coming in contact with the cap of the cartridge. Upon the piston a projection or cam, $a$, is made, which serves to lift up the end of the lever-extractor, F, and prevents the hook of the extractor from disengaging from the cartridge when extracting. The extractor F is pivoted to the bolt $D^2$ and let in from the inside. The cover E and the bolt $D^2$ are formed in one piece, so as to resist heavy charges, and, by making the joint X of the bolts D and $D^2$ so that the bolt D may revolve upon the bolt $D^2$ behind the sear-bolt, the use of an L-shaped slot is avoided in the bolt $D^2$, and the greatest strength is preserved. In order to insure the certainty of extracting the cartridge the end of the bolt is deeply recessed to receive the base of the cartridge. By so doing the cutting away of the barrel for the extractor-hook to enter is avoided. The cartridge is ejected by a pin, $m$, which strikes against the sear-bolt L when the bolt is withdrawn, throwing the cartridge-shell through the opening in the receiver, or by the pressure of a spiral spring on the pin $m$, Fig. 5. The sear-bolt L is kept in place as seen in Fig. 8, or by a V-spring, $s$, Fig. 1. The crank-lever G H is pivoted on an arm of the screw N, the head of which is fitted in a hole made in the lump on the trigger-plate Z, and is lowered or raised by a micrometer-screw, one turn of which is sufficient to put in motion or to stop the working parts of the magazine. The micrometer-screw is secured to the trigger-plate by a pin, $n$. A small pin, $n'$, Fig. 2, passing through the arm on which the crank-lever works, and into a slot in the lump Z on the trigger-plate, prevents the lever-arm G from rising or lowering too much. To raise or lower the arm G—the object sought to be obtained—an eccentric pin, J $J^2$, Fig. 10, operated by a handle, K, on the outside of the stock, and retained in place by the grooves in the plate K', may also be used. In order to reduce the dimensions of the gun the carrier O is made shallow; and to prevent the carrier from jamming or sticking in its motion up and down in the guide-box W, and in order to give the applied force in a direct line with the motion of the carrier, a link-connection, Q, is made between the lever-arm G and the carrier O. In order to admit the cartridge readily into the magazine, a gate, O', is provided. This gate is hinged to the carrier O. A spring, $y$, pressing against the gate O' keeps it effectually closed against the egress of the cartridges from the magazine, but admits of the ingress of cartridges from below to the magazine. In order to provide for cartridges the more readily entering the magazine, an incline, $y'$, is sometimes cut in the lower part of the box and into the magazine-tube. The gate O' and spring $y$ may be applied to a carrier and crank-lever made in one piece, as seen in Fig. 22, so as to enable the magazine to be loaded from the under side. The gate may be made to open outward. The box W is made with a larger opening in the front than is required for the carrier to work in, in order to make room for the thumb or finger in shoving the cartridge into the magazine.

To enable the magazine to be got at readily for the purpose of cleaning, and to provide a suitable means of closing the end of the magazine-tube, the nose-cap $w$ and forward band are made in one piece, as seen in Fig. 23. The flange $w'$ on the ramrod, when the rod is screwed up, keeps the nose-cap from coming off, and keeps the magazine-tube and spiral spring in place in the stock. The nose-cap extends below the stock, and serves for a fastening for the ramrod and swivel. The upper part of the receiver $g$, Fig. 4, is cut away to fit the dovetail edges $g'$ of the cover F, upon which the bolt hangs. By fluting the edges of the cover the friction is further diminished.

We make no claim to the magazine itself, for we are aware that is not new; but

We claim as our invention—

1. The bolt-sections D D², when constructed substantially as described and adapted to be combined and locked together by a stop, T or T', to keep them from turning when open and unlocked, in the act of closing the breech, as and for the purpose hereinbefore set forth.

2. The combination of the crank-lever G H, link Q, and carrier O, substantially as and for the purpose hereinbefore set forth.

3. The means, substantially as herein described, for changing the pivot or fulcrum of the crank-lever G H, consisting of an eccentric pin or screw, in combination with said lever, so that the arm H may be thrown into or out of gear with the breech-bolt, substantially as and for the purpose hereinbefore set forth.

4. A shifting fulcrum-lever, in combination with a breech-block and cartridge-carrier, substantially as and for the purpose hereinbefore set forth.

5. The spring-gate O', pivoted or hung in such relation with the flange or lip on the carrier that its flange or lip, when pressed inward, will shut past the lip on the carrier, substantially as and for the purpose hereinbefore set forth.

6. The receiver having an opening, substantially as described, to prevent the cartridge from being thrown out in its passage from the magazine, substantially as and for the purpose hereinbefore set forth.

7. The piston P, provided with the rib $b$ and lump $a$, in combination with the incline $b^1$ and lever-extractor, substantially as and for the purpose hereinbefore set forth.

8. The V-spring $s$, when combined with the trigger and crank-lever and operating as a trigger and friction spring, substantially as and for the purpose hereinbefore set forth.

9. The combination of the combined nose-cap and band and the ramrod, substantially as and for the purpose hereinbefore set forth.

BETHEL BURTON.
WINGFIELD G. BURTON.

Witnesses:
B. S. MOULTON,
EDWIN WILKINSON.